(12) United States Patent
Schmidt et al.

(10) Patent No.: US 8,632,094 B2
(45) Date of Patent: Jan. 21, 2014

(54) AIRBAG FOR A VEHICLE OCCUPANT RESTRAINING SYSTEM

(75) Inventors: Torsten Schmidt, Berlin (DE); Jens Feller, Illerkirchberg (DE); Tomas Radocak, Ulm (DE); Rainer Heuschmid, Ulm (DE); Robert Getz, Ulm (DE)

(73) Assignee: Takata AG, Aschaffenburg (DE)

( * ) Notice: Subject to any disclaimer, the term of this patent is extended or adjusted under 35 U.S.C. 154(b) by 554 days.

(21) Appl. No.: 12/654,314

(22) Filed: Dec. 16, 2009

(65) Prior Publication Data

US 2010/0171291 A1 Jul. 8, 2010

(30) Foreign Application Priority Data

Dec. 17, 2008 (DE) .......................... 10 2008 063 794

(51) Int. Cl.
*B60R 21/207* (2006.01)
(52) U.S. Cl.
USPC ...................................................... 280/730.2
(58) Field of Classification Search
USPC ................. 280/730.2, 729, 743.1, 743.2, 731
See application file for complete search history.

(56) References Cited

U.S. PATENT DOCUMENTS

| | | | | |
|---|---|---|---|---|
| 5,803,485 | A * | 9/1998 | Acker et al. | 280/728.2 |
| 7,717,459 | B2 * | 5/2010 | Bostrom et al. | 280/730.1 |
| 7,942,444 | B2 * | 5/2011 | Steinbach et al. | 280/743.2 |
| 8,469,395 | B2 * | 6/2013 | Richez et al. | 280/730.2 |
| 2004/0007905 | A1 | 1/2004 | Acker et al. | |
| 2004/0124615 | A1 | 7/2004 | Tanase et al. | |
| 2005/0023808 | A1 | 2/2005 | Sato et al. | |
| 2006/0022441 | A1 | 2/2006 | Hayashi et al. | |
| 2007/0096444 | A1 | 5/2007 | Bostrom et al. | |
| 2008/0079248 | A1 * | 4/2008 | Hayashi | 280/730.2 |
| 2009/0014990 | A1 | 1/2009 | Loibl et al. | |
| 2009/0140509 | A1 | 6/2009 | Johansson et al. | |
| 2009/0184500 | A1 | 7/2009 | Feller et al. | |
| 2009/0200774 | A1 * | 8/2009 | Nam et al. | 280/730.2 |

FOREIGN PATENT DOCUMENTS

| | | |
|---|---|---|
| CN | 1615235 | 5/2005 |
| CN | 1759026 | 4/2006 |
| CN | 1819938 | 8/2006 |
| DE | 197 25 559 A1 | 12/1998 |
| DE | 20 2006 010 878 U1 | 10/2006 |
| DE | 10 2005 047 606 A1 | 4/2007 |

(Continued)

OTHER PUBLICATIONS

Office Action issued Aug. 15, 2012 in corresponding Chinese Patent Application No. 200910260469.8.

*Primary Examiner* — Nicole Verley
(74) *Attorney, Agent, or Firm* — Foley & Lardner LLP

(57) ABSTRACT

An airbag for a vehicle occupant restraining system is provided. The airbag comprises a first inflatable area; a second inflatable area; a shoulder area arranged between the first and seconds area. The shoulder area extends in the inflated status of the airbag in the area of a shoulder and/or in an upper arm region of the vehicle occupant to be protected. The shoulder area has a thickness lower than the thickness of the first and second areas as determined in a direction vertical to the main plane of extension of the inflated airbag or comprises a recess in the airbag. The airbag is to be arranged in a vehicle such that, in case of a side collision of the vehicle, the shoulder and/or the upper arm region of the vehicle occupant strikes the shoulder area of the airbag.

10 Claims, 4 Drawing Sheets

(56) References Cited

FOREIGN PATENT DOCUMENTS

| | | |
|---|---|---|
| DE | 10 2005 059 197 A1 | 7/2007 |
| EP | 1 380 475 A1 | 1/2004 |
| EP | 1 586 489 A1 | 10/2005 |
| JP | 2000-272463 A | 10/2000 |
| WO | WO 98/56622 A1 | 12/1998 |

* cited by examiner

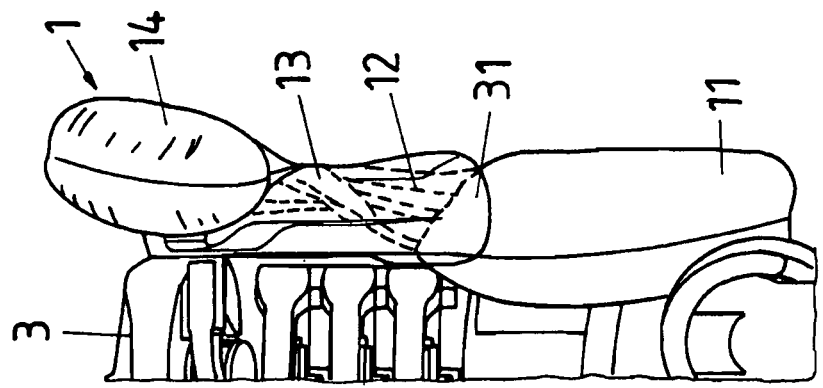
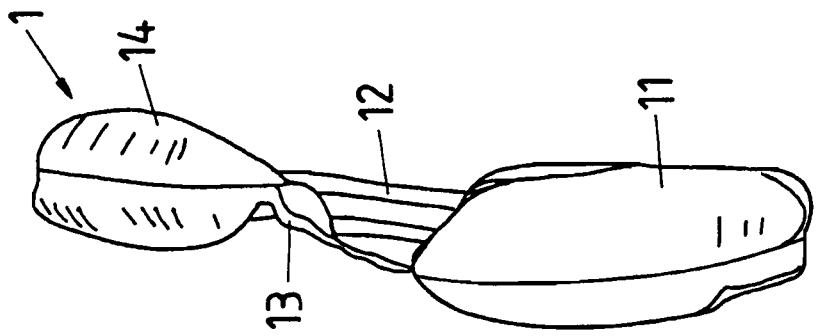
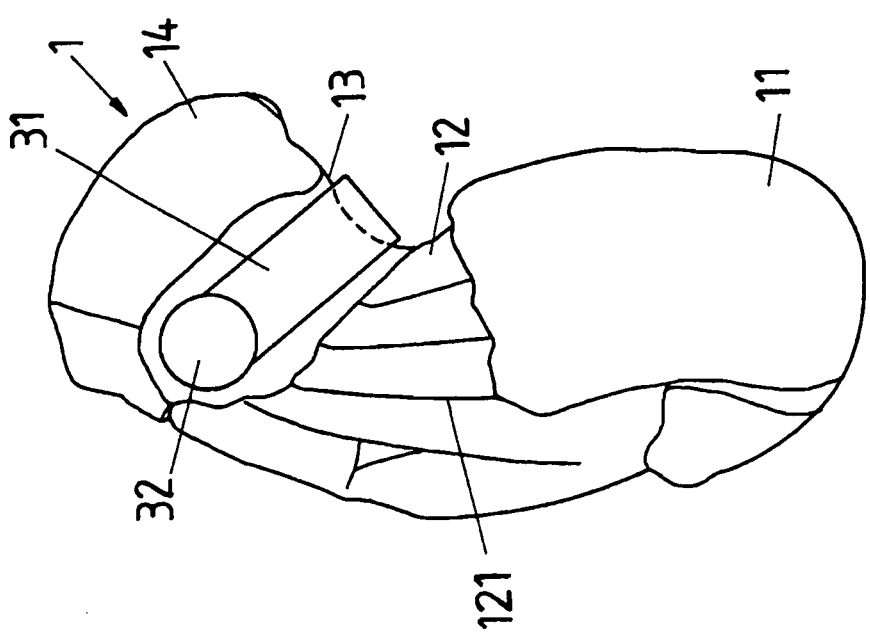

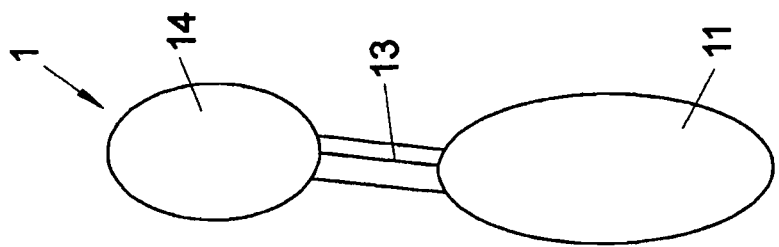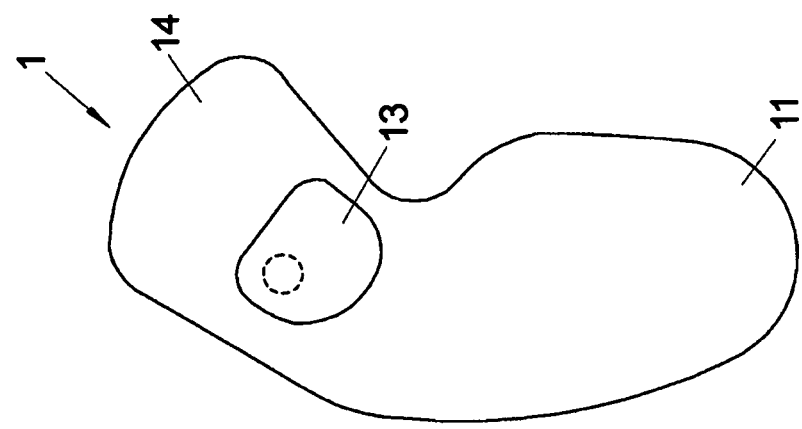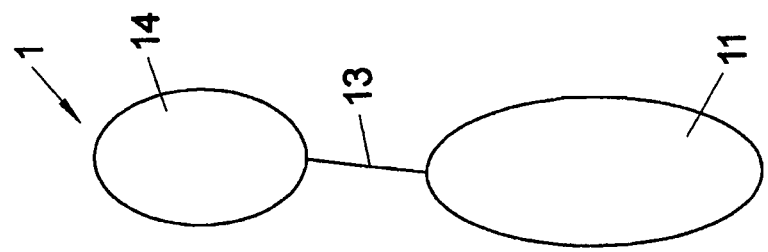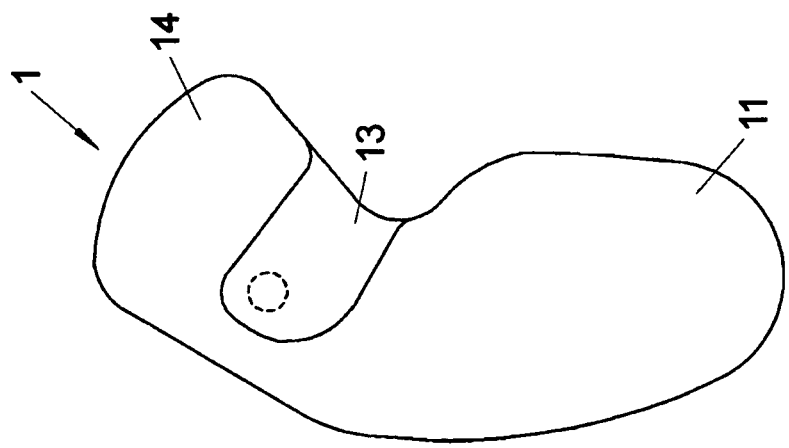

AIRBAG FOR A VEHICLE OCCUPANT RESTRAINING SYSTEM

BACKGROUND

The application relates to an airbag for a vehicle occupant restraining system.

A side airbag is known from DE 10 2005 047 606 A1 provided with areas which have different thicknesses in vehicle cross direction in the inflated status of the airbag.

SUMMARY

An object of at least one of the disclosed embodiments is to be seen in increasing the protective effect of an airbag.

According to an exemplary disclosed embodiment, an airbag for a vehicle occupant restraining system is provided with a first and a second inflatable area;
 a shoulder area arranged between the first and the second areas which extends in the inflated status of the airbag in the area of a shoulder and/or in an upper arm region of the vehicle occupant to be protected and has a lower thickness than the first and the second areas determined in a direction vertical to the main plane of extension of the inflated airbag or comprises a recess in the airbag, whereby
 the airbag is to be arranged in the vehicle such that in case of a side collision of the vehicle the shoulder and/or an upper arm region of the vehicle occupant strikes the airbag in its shoulder area, and whereby
 the airbag is designed such that in case the vehicle occupant strikes the airbag a linking between the shoulder area and the shoulder and/or the upper arm region of the vehicle occupant occurs so that a movement of the airbag in the longitudinal direction of the vehicle effects a movement of the vehicle occupant or vice versa a movement of the vehicle occupant in the longitudinal direction of the vehicle effects a movement of the airbag.

The airbag according to the exemplary embodiment is to be arranged in a vehicle such that it extends in the inflated status essentially in the longitudinal and height directions of the vehicle, e.g. the main plane of extension along which the inflated airbag extends is spanned by the longitudinal and height directions of the vehicle. The "thickness" of the said areas of the airbag is thereby determined in the cross direction of the vehicle.

The airbag according to an exemplary embodiment is designed and arranged such that the vehicle occupant to be protected strikes the airbag essentially crosswise to the main plane of extension of the airbag. In an exemplary variant it is a side airbag which is to be arranged in or on a vehicle seat. However, the invention is not restricted to such side airbags but can also be used for instance in airbags integrated into doors or into curtains.

The shoulder area provides for a linking of the vehicle occupant to the airbag so that in case of a collision during or after the vehicle occupant strikes the airbag it moves in the longitudinal direction of the vehicle essentially in the same direction together with the airbag. Thus, it is in particular avoided that the vehicle occupant moves in the further course of the collision away from the airbag in the longitudinal direction of the vehicle and strikes for instance a vehicle structure in the longitudinal direction of the vehicle adjacent to the airbag. Due to the linkage between the airbag and the vehicle occupant a best possible restraining effect is aimed also for later collision phases.

In an exemplary embodiment, the airbag is designed such that in case the shoulder region of the vehicle occupant strikes the shoulder area of the airbag the first and the second areas of the airbag are moved towards the shoulder of the vehicle occupant and thereby exerts a force onto the shoulder which counteracts a further movement of the shoulder relatively to the airbag. The shoulder is in a way clamped to the airbag so that a movement of the shoulder relative to the airbag is slowed down or prevented.

The airbag can also be designed such that the shoulder region of the vehicle occupant is linked to the shoulder area of the airbag such that also a movement of the vehicle occupant vertical to the main direction of deployment of the airbag, for instance in cross direction of the vehicle, is counteracted or a movement in this direction is prevented.

It is to be pointed out that the formulation "movement of the vehicle occupant" does not necessarily mean that the vehicle occupant as a whole is moved. It is also to be understood under this formulation that only a specific body region, for instance an arm, of the vehicle occupant is moved with the airbag or that vice versa this body region moves the airbag. In analogy, the formulation whereby the "airbag is moved" does not mean necessarily that the complete airbag is moved, but comprises in particular the case that only a section of the airbag is moved, for instance the shoulder area.

According to an exemplary embodiment the shoulder area of the airbag is designed such that it is not inflated during inflation of the airbag. The shoulder area is exemplary provided with a fabric layer or multiple fabric layers connected to each other. The fabric layers consist in particular of textile fabrics (for instance an airbag material). In an exemplary variant the fabric layers forming the shoulder area are sections of airbag layers forming the remaining airbag.

In a further exemplary variant the fabric layer of the shoulder area is fixed with a first section to an outer side of the first area of the airbag and with a second section to an outer side of the second area of the airbag. The outer side of the first area to which the first section of the fabric layer is fixed and the outer side of the second area to which the second section of the fabric layer is fixed point into the same direction, in particular in direction of the vehicle occupant, in the inflated airbag.

In another exemplary embodiment the outer side of the first area to which the first section of the fabric layer is fixed and the outer side of the second area to which the second section of the fabric layer is fixed point into opposite directions.

Furthermore, the fabric layer of the shoulder area is exemplary designed such that it connects the first and the second area of the airbag with each other and is arranged such that the vehicle occupant in case of a collision strikes the fabric layer with its shoulder and takes it along in the direction of impact. Thereby the fabric layer is tightened and transfers a force onto the first and the second area so that these in each case move towards the shoulder of the vehicle occupant which strikes. Thereby a linking (to a certain degree a clamp fixation) of the airbag to the shoulder of the vehicle occupant is generated.

The fabric layer can encompass in an airbag assembled in a vehicle in particular also the upper side of the airbag pointing to the vehicle roof and/or a lower side of the airbag pointing towards the vehicle floor; in particular in order to fix the fabric layer as stable as possible to the remaining airbag.

It is however not mandatory that the shoulder area is folded in a non-inflatable manner. In a further exemplary variant the shoulder area is designed as an inflatable chamber or as an inflatable section of the airbag. The shoulder area is exemplary provided with means for thickness reduction, for instance in form of a dart, a rebound strap arranged inside of the shoulder area and/or a bond seam.

The shoulder area of the airbag designed as an inflatable chamber can be in flow communication with the first and/or inflatable area of the airbag, also if this is not necessarily required.

The first and/or the second area continue exemplary adjacent to an outer line of the shoulder area reduced in its thickness. In a further exemplary variant the shoulder area is at least sectionally surrounded by the first and/or the second area, e.g. the first and/or the second area continue at least along a subsection of the shoulder area around the same. The shoulder area can also be completely surrounded by an inflatable chamber of the airbag (for instance annular). Such a shoulder area is for instance at least approximately formed circularly.

This application also relates to an airbag which is provided with a recess in its shoulder area. The recess is exemplary designed such that the shoulder of the vehicle occupant to be protected dives into the recess in case of a collision so that the first and the second areas of the airbag abut on the shoulder and thus the linking between airbag and vehicle occupant is formed. The recess can also be surrounded by the remaining airbag, e.g. it is designed in the form of a through opening through the airbag. In a further variant the recess is designed in a front area of the airbag—in respect to the airbag assembled into the vehicle—so that—if looked at it in longitudinal direction of the vehicle—behind the recess a (inflatable or also non-inflatable) section of the airbag extends.

In a further exemplary improvement the shoulder area is designed such that it continues—in respect to the vehicle height direction—obliquely downwards adapted to the position of the lateral shoulder region and the progression of an upper arm section of the vehicle occupant to be protected so that in case of a side collision of the vehicle the lateral shoulder region and the upper arm section strike the airbag in its shoulder area. The shoulder area is designed such that in case the vehicle occupant strikes the airbag the lateral shoulder area and the upper arm of the vehicle occupant (in particular sitting on a vehicle seat) are put inside the airbag whereby the linking between vehicle occupant and airbag occurs.

The shoulder area is thereby exemplary designed such that in case the shoulder region and the upper arm section of the vehicle occupant strike, the first and the second area of the airbag are moved towards the shoulder region and the upper arm section such that they counteract a further movement of the shoulder region as well as of the upper arm section relatively to the airbag, e.g. shoulder and arm of the vehicle occupant are fixed to the airbag.

In a further exemplary improvement the first area of the airbag is formed such that in case of a collision of the vehicle the vehicle occupant to be protected strikes it at least sectionally with its head. The second area is exemplary formed such that in case of a collision of the vehicle the vehicle occupant to be protected strikes it with its thorax and/or pelvis region.

The first and the second area of the airbag can be formed as chambers of the airbag which are at least partially separated from each other whereby it is not excluded that they are in a flow communication with each other. However, the chambers can also be formed as inflatable elements completely separated from each other. In an alternative embodiment the first and the second area are formed as sub areas of a common chamber of the airbag.

The application also relates to a vehicle seat with an airbag as described above.

BRIEF DESCRIPTION OF THE DRAWINGS

The invention is explained in the following in more detail by the means of examples referring to the Figures.

FIG. 1A shows a lateral view of the airbag according to a first embodiment.

FIG. 1B shows a front view of the airbag according to FIG. 1A.

FIG. 1C shows a front view of the airbag according to FIG. 1A.

FIG. 2A shows a side view of the airbag according to a second embodiment of the airbag.

FIG. 2B shows a front view of the airbag according to FIG. 2A.

FIG. 3A shows a side view of the airbag according to a third embodiment.

FIG. 3B shows a front view of the airbag according to FIG. 3A.

DETAILED DESCRIPTION

Figure 4A:
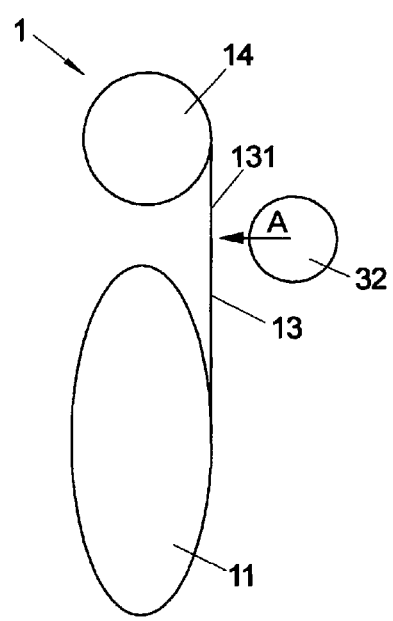
FIG. 4A shows a fourth embodiment of the airbag.

FIGS. 1A-1C show different views of the airbag according to a first embodiment. The airbag 1 is arranged in or on a vehicle seat (not shown), in particular in or on a side of the vehicle seat facing the vehicle long side of the vehicle nearest to the vehicle seat. The airbag is for instance arranged in or on a side wall of a backrest of the vehicle. FIG. 1A shows a lateral view of the airbag if looked at it from the vehicle seat. FIG. 1B shows the front of the airbag e.g. if looked at it from the vehicle front. FIG. 1C corresponds to FIG. 1B whereby the vehicle occupant being on the seat is also shown (reference sign 3).

The airbag 1 has a first, lower area 11 which is assigned to the pelvis region of the vehicle occupant, e.g. a lateral pelvis region of the vehicle occupant will predominantly strike the airbag in this area. Above the first area 11 a thorax area 12 of the airbag 1 follows which again is restricted upwards by a shoulder area 13 of the airbag. The shoulder area 13 continues thereby in respect to the height direction of the vehicle obliquely forwards down so that it extends adapted to the progression of an upper section of an arm 31 of the vehicle occupant. The "progression" of the upper section of the arm relates thereby to a typical body posture for which the airbag 1 is designed.

The airbag 1 is upwardly defined by a second area 14 which is arranged to an upper shoulder area and for instance also a neck/head region of the vehicle occupant.

As depicted in FIGS. 1B and 1C the shoulder area 13 has, crosswise to the main plane of extension along which the airbag 1 extends, in the inflated status a lower thickness as the respective first and second area 11, 14. The shoulder area is formed from a non-inflatable fabric layer which extends between the thorax area 12 and the second area 14. The thorax area 12 is also reduced in its thickness for what a multitude of linear darts 121 is provided.

Airbag 1 is designed such that the vehicle occupant in case of a lateral collision of the vehicle strikes with its shoulder and its arm the shoulder area 13 of the airbag. In case the shoulder 32 (in particular a lateral shoulder area) and the arm section strike the canvas-like designed fabric layer of the shoulder area 13 the fabric layer on the one hand pulls the second upper area 14 downwards and on the other hand the lower areas 11 and 12 of the airbag upwards towards the shoulder and the arm of the vehicle occupant so that for instance the upper arm section 31 is fixed between the upper area 14 and an upper section of the first area 11.

Therefore, a linking between airbag and vehicle occupant is provided so that a further movement of the vehicle occupant after striking the airbag 1 in longitudinal direction of the vehicle leads to a movement of the airbag with the vehicle occupant and therefore counteracts a relative movement between vehicle occupant and airbag. The vehicle occupant does not necessarily pick up the complete airbag but rather in particular the upper area of the airbag (for instance its shoulder area and the area surrounding the shoulder area) is moved. Vice versa a movement of the airbag would cause a simultaneous movement of the shoulder and arm region of the vehicle occupant.

FIGS. 2A and 2B show schematically an airbag according to a further embodiment whereby FIG. 2A is a side view and FIG. 2B a front view. The airbag has in FIGS. 1A-1C a first area 11 which extends in a lower section of the airbag 1. The airbag 1 has furthermore a second, upper section 14 as well as a shoulder area 13 which is arranged obliquely downwards between the first section and the second area of the airbag. The shoulder area 13 continues in analogy to the FIGS. 1A to 1C adapted to a shoulder region and an upper arm section of the vehicle occupant to be protected (not shown). The intended point of impact for the shoulder region of the vehicle occupant is indicated in FIG. 2A by a dotted circular line.

In the front view of the airbag according to FIG. 2B it is recognizable that the shoulder area 13 has vertical to the main direction of extension of the inflated airbag a lower thickness than the respective first and second areas 11, 14. The shoulder area is again in particular formed by a fabric layer ("canvas") and connects the first with the second area. It is also however recognizable that the shoulder area 13 is not designed in form of a fabric layer but as a recess in the airbag.

The shoulder area 13 is surrounded on its rear side, which extends in the assembled status of the airbag towards the rear of the vehicle, by an inflatable chamber of the airbag which also forms the areas 11 and 14. In this area the airbag has for instance a thickness which approximately corresponds to the thickness of the sections 11 and 14.

The FIGS. 3A and 3B relate to an airbag which comes close to the airbag of FIGS. 2A and 2B. In contrast to the FIGS. 2A and 2B the shoulder area 13 of the airbag 1 reduced in its thickness is however completely surrounded by the chamber of the airbag forming the first and the second area 11, 14. The linking between vehicle occupant and airbag occurs in this embodiment mainly via the lateral shoulder region of the vehicle occupant. The shoulder area can be in particular formed in this variant as through opening through the airbag 1, e.g. the fabric layer indicated in FIG. 3B is omitted.

Figure 4B:
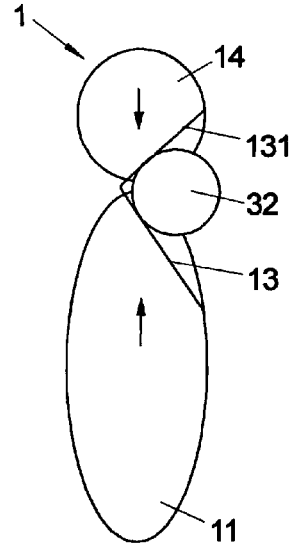
FIG. 4B shows an airbag according to FIG. 4A.

FIGS. 4A and 4B relate to a further embodiment of the airbag whereby the airbag 1 has again a first, lower area 11 as well as a second, upper area 14 between which a shoulder area 13 extends. The shoulder area 13 is formed by a fabric layer 131 which is fixed with a first end to an outer side of the first area 11 and with a second end to an outer side of the second area 14. The fabric layer 131 extends therefore on an outer side of the airbag 1 which faces the shoulder/arm region 31 of the vehicle occupant to be protected. The vehicle occupant is placed in particular on a vehicle seat on which or in its outer side facing the vehicle long side the airbag 1 is arranged.

In a first phase of a lateral collision of a vehicle a relative movement between the vehicle occupant (indicated by its shoulder region 31) and the airbag 1 (indicated by the movement along the direction of impact A of the shoulder 31) is generated whereby vehicle occupant and airbag move towards each other.

The airbag is arranged such that the shoulder region 31 strikes the shoulder area 13 and picks up thereby the fabric layer 131 in the direction of impact. Thereby the fabric layer pulls the first and the second areas 11, 14 towards each other so that it rests against the shoulder region 31 of the vehicle occupant and exerts a clamp force onto the shoulder region 31 which counteracts a further relative movement between the vehicle occupant and the airbag. The vehicle occupant is therefore "fixed" to a certain degree to the airbag 1.

The design of the shoulder area in the form of one or multiple fabric layers can also occur in a different manner in deviation from the embodiments of the FIGS. 4A and 4B as for instance shown in the FIGS. 5A to 5G.

Figure 5A:
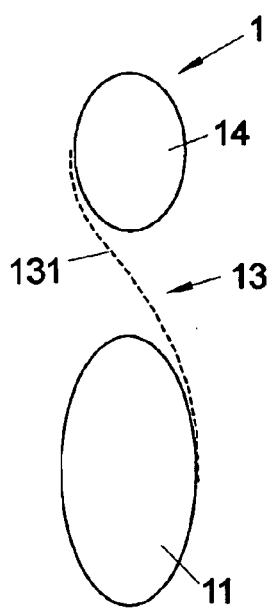
FIG. 5A shows a further embodiment of the airbag in a schematic view.
Figure 5B:
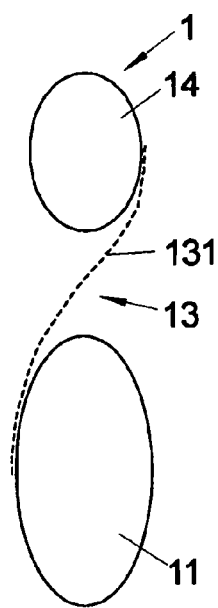
FIG. 5B shows a further embodiment of the airbag in a schematic view.

The fabric layer can be for instance fixed with a first end to a first outer side of the airbag (of the first area 11) and with a second end to a second outer side (of the second area 14) facing away from the first side. This is shown in FIGS. 5A and 5B whereby the outer side of the area 11 to which the first end of the fabric layer 131 is fixed can face away from the vehicle long side (FIG. 5A) or can face towards it (FIG. 5B).

Figure 5C:
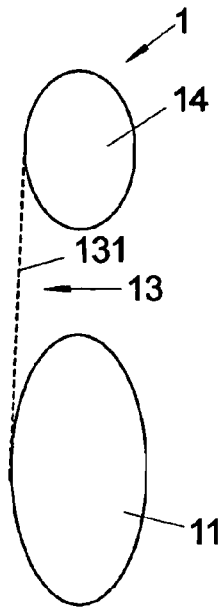
FIG. 5C shows a further embodiment of the airbag in a schematic view.
Figure 5D:
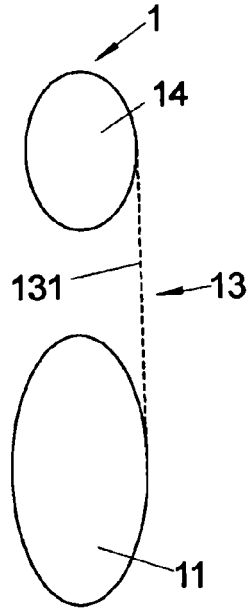
FIG. 5D shows a further embodiment of the airbag in a schematic view.

FIGS. 5C and 5D correspond to the example of the FIGS. 4A and 4B whereby FIG. 5C shows the variant wherein the fabric layer extends on an outer side of the airbag 1 which faces away from the vehicle long side.

Figure 5E:
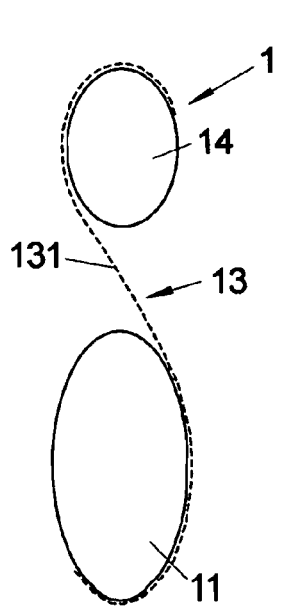
FIG. 5E shows a further embodiment of the airbag in a schematic view.
Figure 5F:
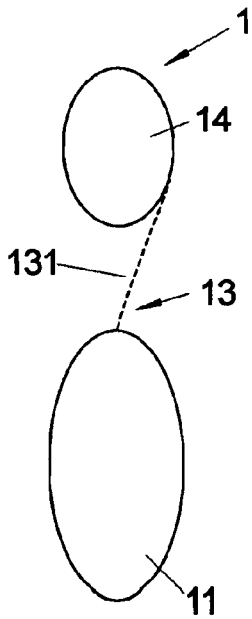
FIG. 5F shows a further embodiment of the airbag in a schematic view.
Figure 5G:
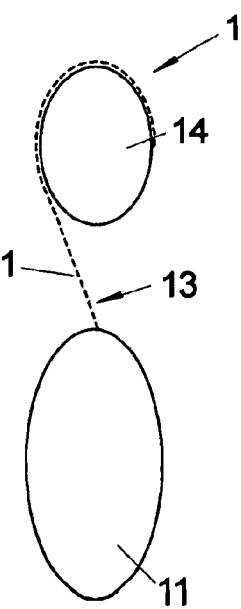
FIG. 5G shows a further embodiment of the airbag in a schematic view.

FIGS. 5E to 5G show further options for fixing the fabric layer 131 to the first and the second area 11, 14 of the airbag 1. According to FIG. 5E the first end fixed to the outer side of the first area 11 as well as the second end fixed to the outer side of the second area 14 encompass the remaining airbag whereby the first end encompasses a bottom side of the airbag (of the first area 11) —in respect to the height direction of the vehicle—and the second end encompasses an upper side of the airbag (of the second area 14).

According to FIGS. 5F and 5G the lower end of the fabric layer 131 is fixed to an upper area of the lower first area 11, whereby the fabric layer does not rest here against an outer side of the lower area 11 in a two-dimensional manner but strikes with an edge the lower area 11.

The fabric layer 131 can for instance be fixed by an adhesive or sewn seam to the lower area 11 and the upper area 14 of the airbag 1. In another embodiment the fabric layer 131 is formed in one piece with an airbag layer which forms the lower and/or the upper area of the airbag 1.

The priority application, German Patent Application Number 10 2008 063 794.7, filed on Dec. 17, 2008 is incorporated by reference herein in its entirety.

What is claimed is:
1. An airbag for a vehicle occupant restraining system, comprising:
a first inflatable area;
a second inflatable area; and
a shoulder area arranged between the first inflatable area and the second inflatable area, wherein the shoulder area extends in an inflated status of the airbag in an area of a shoulder, an area of an upper arm region, or a combination thereof of a vehicle occupant to be protected and has a thickness lower than thicknesses of the first inflatable area and the second inflatable area as determined in a direction vertical to a main plane of extension of the inflated airbag, wherein the airbag is configured to be arranged in a vehicle such that, in case of a side-collision of the vehicle, the shoulder, the upper arm region, or the combination thereof of the vehicle occupant strikes the shoulder area on the airbag, wherein the airbag is designed such that, in case the vehicle occupant strikes the airbag, a linking between the shoulder area and the shoulder, the upper arm region, or the combination thereof of the vehicle occupant occurs so that a movement of the airbag in a longitudinal direction of the vehicle effects a movement of the vehicle occupant or a movement of the vehicle occupant in the longitudinal direction of the vehicle effects the movement of the airbag, wherein the linking occurs such that, in case the shoulder, the upper arm region, or the combination thereof of the vehicle occupant strikes the shoulder area of the airbag, the first inflatable area and the second inflatable area are moved towards the shoulder, the upper arm region, or the combination thereof of the vehicle occupant such that a force is exerted onto the shoulder, the upper arm region, or the combination thereof which counteracts a further movement of the vehicle occupant relative to the airbag, wherein the shoulder area has a fabric layer, wherein the fabric layer is fixed with a first section to an outer side of the first inflatable area of the airbag and with a second section to an outer side of the second inflatable area of the airbag, and wherein an inner surface of the first section of the fabric layer faces the outer side of the first inflatable area and an inner surface of the second section of the fabric layer faces the outer side of the second inflatable area.

2. The airbag according to claim 1, wherein the outer side of the first area to which the first section of the fabric layer is fixed and the outer side of the second area to which the second section of the fabric layer is fixed point into the same direction in the inflated airbag.

3. The airbag according to claim 1, wherein the outer side of the first area to which the first section of the fabric layer is fixed and the outer side of the second area to which the second section of the fabric layer is fixed face the vehicle occupant to be protected in the inflated airbag.

4. The airbag according to claim 1, wherein the first section of the fabric layer is fixed to a connecting portion of the outer side of the first inflatable area, and the second section is fixed to a connecting portion of the outer side of the second inflatable area, wherein one of (1) the connecting portion of the outer side of the first inflatable area and the connecting portion of the outer side of the second inflatable area face towards the vehicle occupant or (2) the connecting portion of the outer side of the first inflatable area faces away from the connecting portion of the outer side of the second inflatable area.

5. The airbag according to claim 1, wherein the fabric layer is a separate part connected to the airbag.

6. The airbag according to claim 1, wherein the fabric layer is connected to the airbag by an adhesive or a seam.

7. The airbag according to claim 1, wherein the fabric layer is a separate part connected to the first and second inflatable areas of the airbag.

8. The airbag according to claim 1, wherein the fabric layer is fixed to the first and second inflatable areas of the airbag by an adhesive or a seam.

9. An airbag for a vehicle occupant restraining system, comprising:
    a first inflatable area;
    a second inflatable area; and
    a shoulder area arranged between the first area and the second area,
    wherein the shoulder area extends in an inflated status of the airbag in an area of a shoulder, an area of an upper arm region, or a combination thereof of a vehicle occupant to be protected and has a thickness lower than thicknesses of the first area and the second area as determined in a direction vertical to a main plane of extension of the inflated airbag,
    wherein the airbag is configured to be arranged in a vehicle such that, in case of a side-collision of the vehicle, the shoulder, the upper arm region, or the combination thereof of the vehicle occupant strikes the shoulder area on the airbag,
    wherein the airbag is designed such that, in case the vehicle occupant strikes the airbag, a linking between the shoulder area and the shoulder, the upper arm region, or the combination thereof of the vehicle occupant occurs so that a movement of the airbag in a longitudinal direction of the vehicle effects a movement of the vehicle occupant or a movement of the vehicle occupant in the longitudinal direction of the vehicle effects the movement of the airbag,
    wherein the linking occurs such that, in case the shoulder, the upper arm region, or the combination thereof of the vehicle occupant strikes the shoulder area of the airbag, the first area and the second area are moved towards the shoulder, the upper arm region, or the combination thereof of the vehicle occupant such that a force is exerted onto the shoulder, the upper arm region, or the combination thereof which counteracts a further movement of the vehicle occupant relative to the airbag,
    wherein the shoulder area has a fabric layer,
    wherein the fabric layer is fixed with a first section to an outer side of the first area of the airbag and with a second section to an outer side of the second area of the airbag, and
    wherein the outer side of the first area to which the first section of the fabric layer is fixed and the outer side of the second area to which the second section of the fabric layer is fixed face away from each other in the inflated airbag.

10. An airbag for a vehicle occupant restraining system, comprising:
    a first inflatable area;
    a second inflatable area; and
    a shoulder area arranged between the first inflatable area and the second inflatable area,
    wherein the shoulder area extends in an inflated status of the airbag in an area of a shoulder, an area of an upper arm region, or a combination thereof of a vehicle occupant to be protected and has a thickness lower than thicknesses of the first inflatable area and the second inflatable area as determined in a direction vertical to a main plane of extension of the inflated airbag,
    wherein the airbag is configured to be arranged in a vehicle such that, in case of a side-collision of the vehicle, the shoulder, the upper arm region, or the combination thereof of the vehicle occupant strikes the shoulder area on the airbag, wherein the airbag is designed such that, in case the vehicle occupant strikes the airbag, a linking between the shoulder area and the shoulder, the upper arm region, or the combination thereof of the vehicle occupant occurs so that a movement of the airbag in a longitudinal direction of the vehicle effects a movement of the vehicle occupant or a movement of the vehicle occupant in the longitudinal direction of the vehicle effects the movement of the airbag, wherein the linking occurs such that, in case the shoulder, the upper arm region, or the combination thereof of the vehicle occupant strikes the shoulder area of the airbag, the first inflatable area and the second inflatable area are moved towards the shoulder, the upper arm region, or the combination thereof of the vehicle occupant such that a force is exerted onto the shoulder, the upper arm region, or the combination thereof which counteracts a further movement of the vehicle occupant relative to the airbag, wherein the shoulder area has a fabric layer, wherein the fabric layer is fixed with a first section to an outer side of the first inflatable area of the airbag and with a second section to an outer side of the second inflatable area of the airbag and wherein an inner surface of the first section of the fabric layer abuts the outer side of the first inflatable area and an inner surface of the second section of the fabric layer abuts the outer side of the second inflatable area.

\* \* \* \* \*